United States Patent [19]

Meek

[11] 3,969,473
[45] July 13, 1976

[54] METHOD OF CORRUGATING A WEB OF THIN THERMOPLASTIC MATERIAL IN A CONTINUOUS PRODUCTION

[75] Inventor: George W. Meek, Fort Myers, Fla.

[73] Assignee: Aktiebolaget Carl Munters, Sollentuna, Sweden

[22] Filed: Mar. 12, 1974

[21] Appl. No.: 450,531

[30] Foreign Application Priority Data
Mar. 13, 1973  Sweden............................. 7303518

[52] U.S. Cl.................................... 264/90; 264/92; 264/285; 264/286
[51] Int. Cl.².......................................... B29C 24/00
[58] Field of Search ................ 264/90, 285, 286, 92

[56] References Cited
UNITED STATES PATENTS
3,477,894   11/1969   Graff.............................. 264/286 X

*Primary Examiner*—Richard R. Kucia
*Attorney, Agent, or Firm*—Eric Y. Munson

[57] ABSTRACT

Method for continuously forming a corrugated web of thermoplastic material in which the corrugations extend diagonally across the web. The web is first softened by heat and then passed to a molding belt which moves in an endless path while supporting and advancing the web in a longitudinal direction. The molding belt is provided with grooves corresponding to the corrugations in the web. The corrugations are formed initially by poking the softened web progressively into the grooves without stretching the web to any substantial degree. The thus initially formed corrugations are thereafter drawn into the grooves and retained therein by applying suction to the bottom side of the molding belt.

1 Claim, 8 Drawing Figures

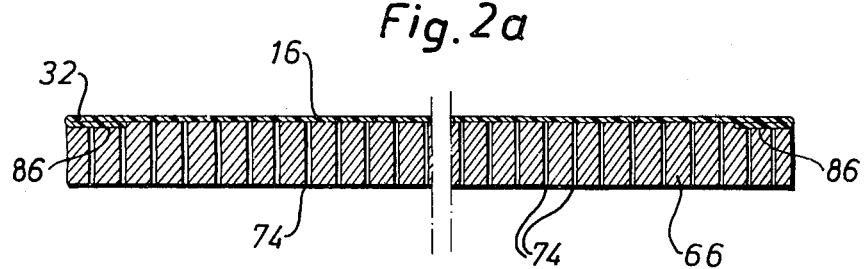
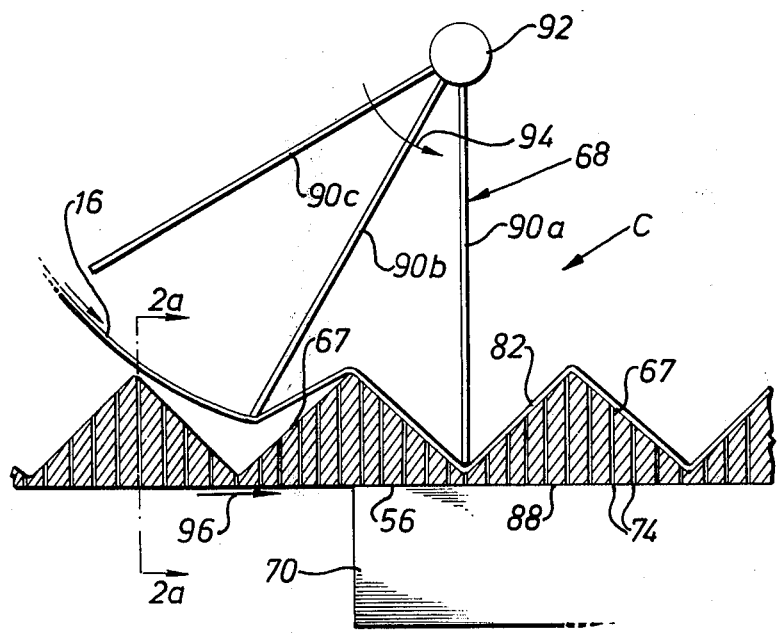

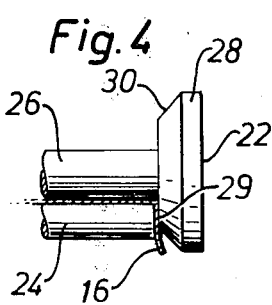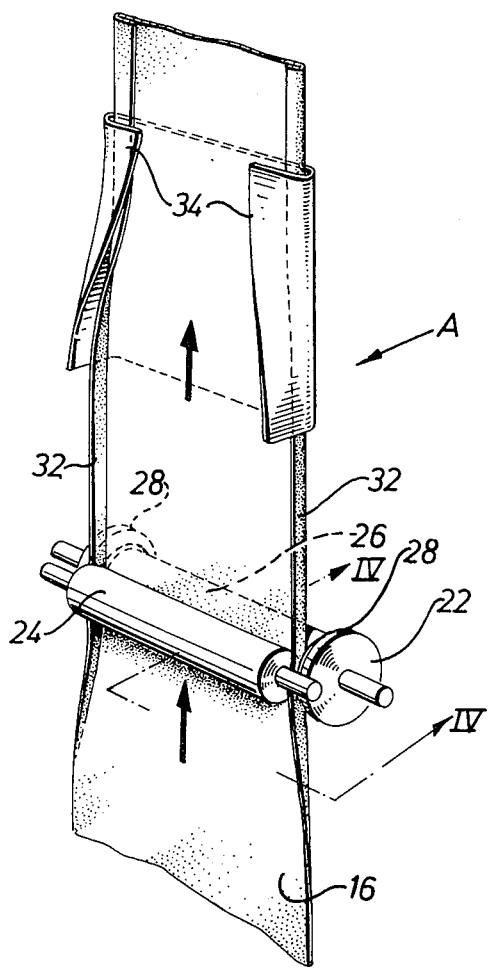

METHOD OF CORRUGATING A WEB OF THIN THERMOPLASTIC MATERIAL IN A CONTINUOUS PRODUCTION

FIELD OF THE INVENTION

This invention relates to a method of forming a web of thin thermoplastic material with corrugations in a continuous production.

More particularly this invention relates to a method of forming a web of thin thermoplastic material with corrugations in a continuous production by heating a web to soft state and thereupon conveying it into crosswise, preferably diagonally extending grooves in a mould movable along a closed path, which mould is subjected to a pressure differential, preferably a partial vacuum, between its two sides.

THE PRIOR ART

It is known to draw a web of thin sheet material down into the grooves of the mould by means of a partial vacuum produced at the underside thereof. The reduced pressure thus serves the entire purpose of forming corrugations in the web of material. In using this procedure the soft web is subjected to a stretching action which can not be avoided especially as the web during the formation of each corrugation is forced against the rear ridge of the groove as the corrugation is pulled down towards the bottom of the groove. As the tractional force exerted on the soft web varies during the different stages of the formation of the corrugations the degree of stretching will also vary with consequent variations in the thickness of the corrugated web. Thus it becomes considerably weakened in some portions whereby the corrugated layer of material as a whole will have a reduced mechanical strength which is always determined by the weakest place.

Layers or sheets manufactured according to the invention are used primarily for contact bodies or exchanger bodies for two media one of which may be a liquid, such as water, and the other a gas, such as air. Examples of such application are cooling towers, moistening devices, so called scrubbers, and similar apparatus. Due to the generally uncontrollable weakening in the corrugated layers, such contact or exchanger bodies have a substantially reduced capacity of resistance to strains caused by supplied water, precipitation of ice and similar causes.

MAIN OBJECTS OF THE INVENTION

One main object of the invention is to provide an improved method of continuous manufacture of the corrugated web of plastic material by which partial or local weakening of the finished web effectively is avoided.

Another main object of the invention is to provide a method which combines the continuous manufacture of the corrugated web of plastic material without any partial or local weakening in the final product with a folding over of at least one lateral edge of the web in order to obtain a reinforced web or sheet material.

Still an object of the invention is to provide an apparatus for carrying out the combined method of manufacture in a continuous process.

SUMMARY OF THE INVENTION

According to one main feature of the invention the web of plastic material, after the heat treatment in a first step is subjected to a mechanical force which acts mainly transversely to the longitudinal direction of the web and progressively inserted into successive grooves. The corrugations thus initially formed are thereafter in a second step, while still soft, finally brought to conform to the contour of the grooves by the pressure differential acting on the web.

In view of the fact that the corrugations are located in the grooves before the pressure differential or the partial vacuum acts on them, the traction forces acting in the longitudinal direction of the web become negligible and the final formation of the corrugations can be made without weakening in parts of the corrugations. The soft thin web can be poked down mechanically while it is located in the passage between the heating zone and the moulding zone where the web loosely hangs down. The web may be fed from the storage roll before the web has become soft in the heating zone.

The method according to the invention can with advantage be combined with a treatment step comprising folding over at least one of the longitudinally extending edges of the web of material resulting in doubled thickness of the edge which imparts increased mechanical strength to this part of the web or sheet material which is exposed most to external strains or loads.

The invention includes also an apparatus for carrying out the method. This apparatus comprises guide members for conveying the web of material to be corrugated past a station with heater members for softening the material and thereafter over a moulding table which moves along an endless path and is provided with grooves corresponding to the desired corrugations, a space being provided at the underside of the moulding table, which space communicates with a source of partial vacuum. The apparatus is characterized by a forming head arranged between the heating station and the moulding table at the feed end for the web of material and driven synchronously with said table and provided with vanes or battens in correspondence with the grooves, said forming head being designed to poke the corrugations down into the grooves as a first step before the final moulding thereof is effected by the partial vacuum.

Further objects, features and advantages of the invention will become apparent from the following description of an apparatus for carrying out the method considered in connection with the accompanying drawings, which form part of this specification and of which:

BRIEF DESCRIPTION OF THE DRAWINGS

FIG. 2a is a sectional view following the line 2a—2a of FIG. 2b.

FIG. 2b illustrates diagramatically the forming of the corrugations.

FIG. 3 is a perspective view of a portion of the apparatus where the folding over of the lateral edges of the web of material is effected.

FIG. 4 is a sectional view following the line IV—IV of FIG. 3.

DETAILED DESCRIPTION OF THE PREFERRED EMBODIMENT

Figure 1:
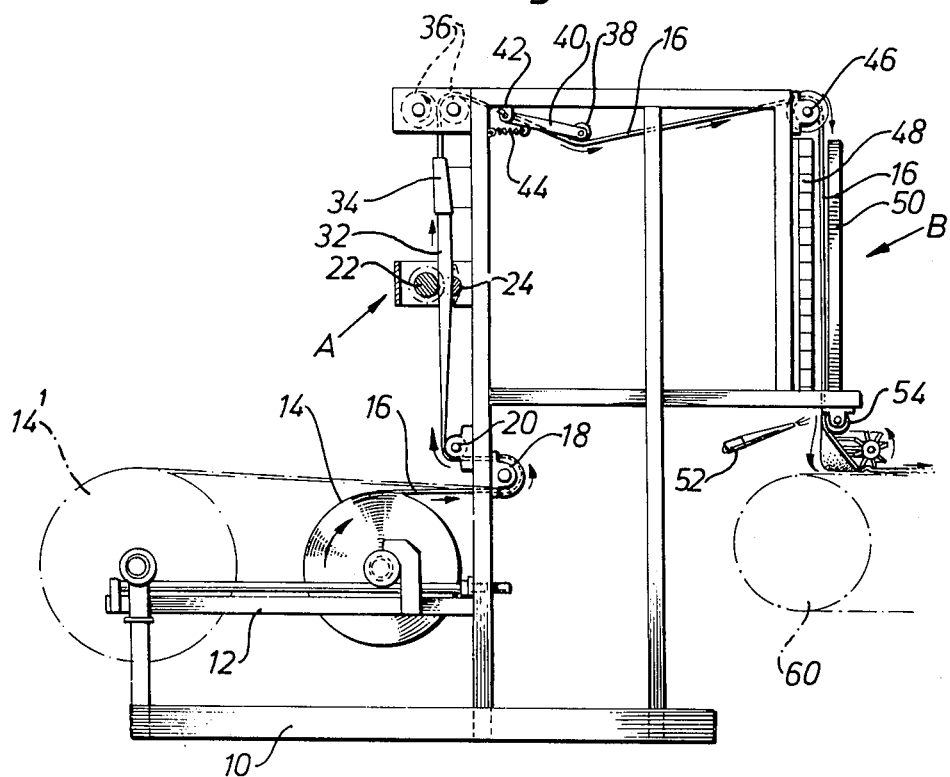
FIGS. 1 and 2 are side elevations of the left-hand and the right-hand part of the apparatus respectively.

Referring now to the drawings, the illustrated apparatus comprises the following main parts: a station A for folding over the lateral edges of the web of material; a station B for heating the web; and a station C for the forming of the web with corrugations.

The frame 10 of the apparatus comprises a table 12, in which is journalled a storage roll 14 of a web of thin thermoplastic material such as polystyrene, polyvinyl chloride or some other plastic material. The table may suitably also carry a spare roll $14^1$, so that a fresh roll may be brought into the production line in the simplest way. The web 16 of material is guided about two guide pulleys 18, 20 in upward direction to the edge folding station A through which it preferably moves in a vertical direction. This station is equipped with two rollers 22, 24, of which the roller 22 has a cylindrical central portion 26 and two end discs 28. The latter have an inner plane surface 29 which merges with a conical surface 30. The second roller 24 has a cylindrical contour which matches the cylindrical central portion 26 of the roller 22, so as to provide a gap between the ends of the portion 26 and the disc surfaces 29, said gap slightly exceeding the thickness of the web of material. The length of the cylinders 24, 26 corresponds to the desired width of the finally corrugated web of material. Since this length is shorter than the width of the web, the lateral edges 32 of the web will be folded at an angle of 90° between the cylinder 24 and the end discs 28 of the cylinder 22. During the continued movement of the web of material, these portions 32 folded by 90° will be further folded guide rails 34 an additional 90° inwardly towards the web which thereupon passes between two driving rollers 36 adjacent the upper end of the edge folding station A. Thus the web is drawn upwards from the storage roll 14 through said station by the rollers 36 bearing against one another. The web still has room temperature and therefore maximum mechanical strength.

Thereafter, the web is guided approximately horizontally to that part of the frame 10 which houses the heating station B. In the upper part of the frame a feeler roller 38 may be arranged which is supported by arms 40 mounted pivotably about journals 42 and actuated by traction springs 44. This roller controls the driving rollers 36 so that the web will always describe a loosely sagging curve between the driving rollers and the station B.

After having passed over a guide pulley 46, the web 16 is moved vertically downwards along a row of electrical heaters 48. A a reflector 50 which accumaulates radiated heat may be located opposite to the heaters so that the rear side of the web will also be heated. The web softens now to such a degree that it becomes mouldable. Since the lateral edges 32 have been folded over the web here has double thickness. For this reason said edges e.g. below the heaters 48 may be further heated by an additional heating device 52. This device may consist of tubes through which hot air is supplied.

The web 16 of material continues thereupon over one or several guide rollers to the corrugating station C (FIG. 2) where it moves in a substantially horizontal direction. This station comprises a moulding table 56 which follows an endless path between two sprockets 58, 60 mounted rotatably about shafts 62 and 64, respectively, in the stationary frame 10. The moulding table is composed of sheet metal parts or plates 66 (FIGS. 2a, 2b) which are provided with grooves 67 corresponding to the corrugations with which the web of material is to be formed. The plates form in the upper part of the moulding table 56 an even, coherent moulding track, the grooves 67 of which are positioned diagonally which means that they form an oblique angle to the lateral edges of the web. The table may in this connection be made as is disclosed in the U.S. Pat. No. 3,470,280 or U.S. patent application Ser. No. 257,841 filed May 30, 1972, now U.S. Pat. No. 3,819,453 which is referred to for a more detailed description of the structural features and mode of operation of the table. The plates 66 may have a plane surface 88 opposite to the grooves 67. After the adjacent plates horizontally located have passed over the upper part of the table they are returned to the feed-in end of the moulding table at the lower portion of the endless table as is disclosed by said patents.

Provided at the feed-in end is a corrugating or forming head 68 equipped with vanes or battens which are parallel to the diagonally positioned grooves in the moulding track and driven synchronously therewith so that one batten or vane each time moves downwards into a groove in the table and during this movement carries along a portion of the web 16 of material. The forming head 68 may in this connection be formed as is disclosed in said patent specifications or in the U.S. Pat. No. 3,682,747.

In FIG. 2b three of the vanes or battens of the forming head are denoted 90a, 90b and 90c. They rotate about an axis 92 in the direction 94 of rotation and synchronously with the direction 96 of movement of the moulding table 56.

Between the guide pulley 54 and the forming head 68 the material web 16 hangs down loosely and no traction and hence no stretching of the web will occur, when it is progressively poked down into the successive grooves of the moulding table by the battens of the forming head 68. Thus, when the soft web 16 begins to be poked downwards into a groove 67 by the vane 90b it is brought into overlying engagement with the front ridge of the groove, viewed in the direction of movement 96 of the table, without any detrimental sliding movement but is positioned above the next following ridge behind engaged groove. The poking down of the web into the groove can be started by the vane 90c and is completed by the vane 90a as shown in FIG. 2b. Since the plates 66 of the moulding table 56 are cold when the latter arrive beneath the forming head 68, it is important not to cool the web of material and not to impart thereto a non-uniform temperature by too early a partial contact with the plates.

Thus, when a corrugation has just been formed in a groove and follows substantially the contour thereof, the corrugation will be subjected at the underside to a partial vacuum which is produced in a vacuum box 70 below the upper part of the moulding table. This box communicates through a duct 72 with a vacuum source. Since the web of material is heated and soft it can now without being subjected to any detrimental stretching force in the longitudinal direction be moulded exactly to the shape of the grooves. As will be seen from FIGS. 2a and 2b the plates of the mould have perforations 74 through which the partial vacuum reaches the web of plastic sheet material.

Thereafter, the web of sheet material continues with the newly formed corrugations lying in the grooves 67 of the moulding table 56 while the moulding table passes through another vacuum zone defined by a box 76 and provided with a duct 78 communicating with a vacuum source. The reduced pressure in the second zone may be less than in the first one and the second zone serves also for cooling the corrugated web of material so that this regains its original hard condition.

Figure 2:
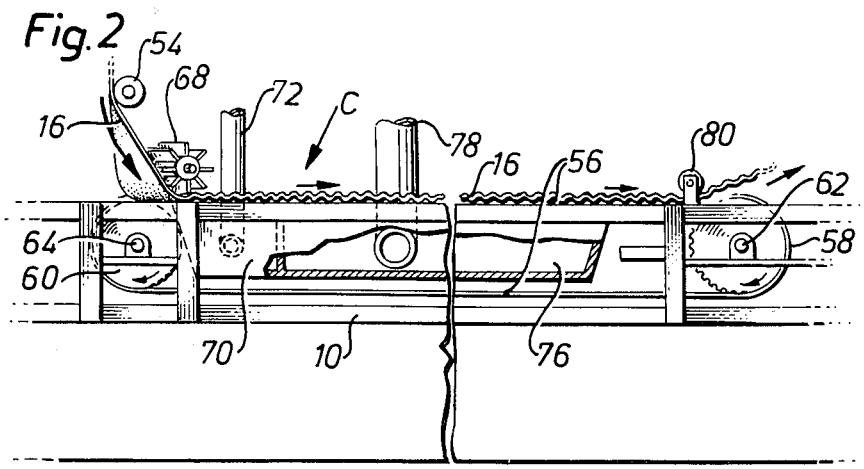

FIG. 2, shows a guide rollers 80 at the end of the moulding table from which roller the finally corrugated web leaves to be severed into pieces of desired length.

Figure 5:
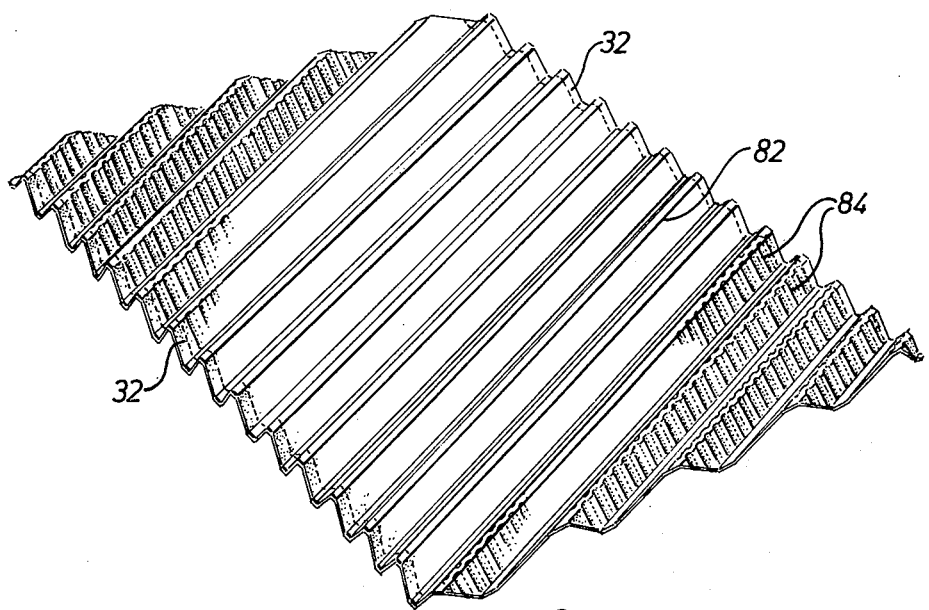
FIGS. 5 and 6 are perspective views of a portion of a corrugated web of material and represented in various degrees of enlargement.
Figure 6:
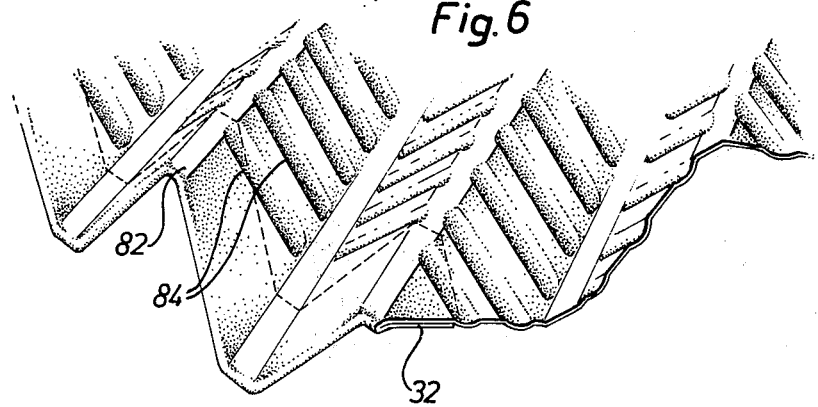

The shape of the final plastic is best seen in FIGS. 5 and 6. It has diagonally extending corrugations 82 which may have a height of between 5 and 50, preferably between 12 and 25 mms, and smaller or shallower grooves 84 which extend transversely to the longitudinal direction of the corrugations between the grooves and ridges thereof. These smaller or shallower grooves have for their purpose to reinforce the sheet and to enhance the dispersion of the liquid e.g. when the finished contact body in a cooling tower is flushed with water.

Along their edges, the sheet of plastic material has folded-over portions 32 which to a substantial degree contribute increased mechanical strength of the sheets and consequently to the contact body manufactured therefrom. For this purpose the sheets are assembled one above the other, as is disclosed in by way of example the U.S. Pat. No. 3,415,502 with the bigger corrugations 32 crossing one another in adjacent sheets. The layers may have a thickness of some tenth or several tenths of one millimeter and thus their thickness at the edge portions 32 will be double the latter. In order to prevent the portions of the sheets between their thickened edge portions coming into full contact with one another the lateral edges of the moulding plates are made as shown in FIG. 2a with the ridge summits proper provided with recesses 86 which fit to the width of the folded-over portions 32. Thus the outwardly facing ridges of the corrugations during the moulding of the soft web will be located in the same plane so that they abut against the ridges of the adjacent layers under the same conditions in their entire longitudinal extension. In this manner uniformity of thickness of the sheets throughout a pack formed by the sheets will be ensured. The layers or sheets are interconnected at the places of contact between the ridges of adjacent layers or sheets. In this connection it is essential that the ridges are located in the same plane so that the number of places of contact reaches a maximum value. The folded-in edge portions 32 need not be glued together in the main portion of the web.

ALTERNATIVE EMBODIMENT

According to an alternative embodiment the edge folding station A is located behind the heating station B and thus ahead of the corrugations forming station C. The web of material will thus be soft when the folding over of its lateral edges is effected.

While one more or less specific embodiment of the invention has been shown and described, it is to be understood that this is for purpose of illustration only, and that the invention is not to be limited thereby, but its scope is to be determined by the appended claims.

What is claimed is:

1. Method of continuously forming a corrugated web from thermoplastic thin sheet material which is rendered relatively weak when heated, the corrugations extending at an oblique angle to the side edges of the web, said method comprising;
   a. moving the web through a heating zone to soften the thermoplastic material into moldable condition;
   b. folding over at least one of the lateral edge portions to produce a thickened edge to reinforce the softened web;
   c. introducing the softened web in depending slack condition to a continuously moving longitudinal corrugating zone comprising a series of diagonal ridges and grooves for engaging and advancing the web in said zone;
   d. forming the corrugations initially by mechanically depressing the softened advancing web without any substantial stretching thereof progressively into successive grooves while maintaining the introductory portion of the web in slack condition;
   e. applying suction beneath the thus initially formed corrugations to draw them against the surfaces of the grooves and to harden and set the thus completed corrugations; and
   f. forming a plurality of ribs in said corrugations by drawing the web against corresponding ridges in the corrugating zone in the suction applying step.

* * * * *